(12) United States Patent
Wu et al.

(10) Patent No.: US 11,907,474 B2
(45) Date of Patent: Feb. 20, 2024

(54) INFRARED TOUCH SCANNING METHOD, APPARATUS AND STORAGE MEDIUM

(71) Applicant: Anhui Hongcheng Opto-Electronics Co., Ltd., Anhui (CN)

(72) Inventors: Jiasen Wu, Anhui (CN); Jiangnan Gong, Anhui (CN)

(73) Assignee: Anhui Hongcheng Opto-Electronics Co., Ltd., Bengbu (CN)

( * ) Notice: Subject to any disclaimer, the term of this patent is extended or adjusted under 35 U.S.C. 154(b) by 0 days.

(21) Appl. No.: 18/038,446

(22) PCT Filed: Dec. 30, 2020

(86) PCT No.: PCT/CN2020/141534
§ 371 (c)(1),
(2) Date: May 24, 2023

(87) PCT Pub. No.: WO2022/134168
PCT Pub. Date: Jun. 30, 2022

(65) Prior Publication Data
US 2024/0012508 A1    Jan. 11, 2024

(30) Foreign Application Priority Data
Dec. 21, 2020 (CN) .......................... 202011522133.7

(51) Int. Cl.
*G06F 3/042* (2006.01)
*G06F 3/041* (2006.01)

(52) U.S. Cl.
CPC .......... *G06F 3/04166* (2019.05); *G06F 3/042* (2013.01)

(58) Field of Classification Search
CPC .................. F21V 9/08; F21Y 2115/15; G06F 2203/04103; G06F 2203/04112;
(Continued)

(56) References Cited

U.S. PATENT DOCUMENTS

2012/0249485 A1* 10/2012 Ye .......................... G06F 3/0421
345/175
2014/0264036 A1* 9/2014 Hung .................... G06F 3/0421
250/349

FOREIGN PATENT DOCUMENTS

CN         103076929 A       5/2013
CN         104881183 A       9/2015
(Continued)

OTHER PUBLICATIONS

The International search report for PCT Application No. PCT/CN2020/141534, dated Sep. 18, 2021, 4 pages.

*Primary Examiner* — Insa Sadio
(74) *Attorney, Agent, or Firm* — East IP P.C.

(57) ABSTRACT

The present application provides an infrared touch scanning method, including: grouping transmitting lights located on a frame of an infrared touch screen to obtain at least two transmitting light groups; setting at least two scanning modes and setting one of the scanning modes as a basic scanning mode; establishing a corresponding relationship between the at least two scanning modes and a writing speed; performing a scanning using the basic scanning mode to determine a current writing speed of a user; determining a corresponding scanning mode from the scanning modes according to the corresponding relationship and the current writing speed of the user; and performing a scanning using the determined corresponding scanning mode. The present application further provides an infrared touch scanning control apparatus and a storage medium.

16 Claims, 4 Drawing Sheets

(58) Field of Classification Search
CPC ............... G06F 3/03547; G06F 3/0412; G06F 3/04164; G06F 3/044; G06F 3/0443; G06F 3/0446; H10K 50/841; H10K 50/844; H10K 50/865; H10K 59/12; H10K 59/1201; H10K 59/131; H10K 59/38; H10K 59/40
See application file for complete search history.

(56) References Cited

FOREIGN PATENT DOCUMENTS

| | | | |
|---|---|---|---|
| CN | 10624 9968 | A | 12/2016 |
| CN | 108 021290 | A | 5/2018 |
| CN | 105094463 | B | 9/2018 |

\* cited by examiner

INFRARED TOUCH SCANNING METHOD, APPARATUS AND STORAGE MEDIUM

CROSS-REFERENCE TO RELATED APPLICATION

This application is a National Stage of International Application No. PCT/CN2020/141534 filed on Dec. 30, 2020, which claims priority to Chinese patent application No. 202011522133.7 filed on Dec. 21, 2020, and entitled "INFRARED TOUCH SCANNING METHOD, APPARATUS AND STORAGE MEDIUM", both of which are incorporated herein by reference in their entireties.

TECHNICAL FIELD

One or more embodiments of the present application relate to the technical field of infrared touch technology, and particularly, to an infrared touch scanning method, apparatus and storage medium.

BACKGROUND

At present, big touch screens on the market mainly include big infrared touch screens and big capacitive touch screens. The big capacitive touch screens are mainly used in high-end devices (such as big touch screens used in business and other fields) and are expensive. The big infrared touch screens are mainly used in education, low-end and middle-end conference rooms and white boards for education, and the price is acceptable. However, with rapid development of the size of big screens, people's demands for touch products are also increasing. From the original small and medium-sized touch screens to large-sized touch screens for education, the size required for touch screens is increasing, and intelligence, high-performance and low-cost are trends for the development of the touch screens.

Currently, the scanning logic of infrared light-emitting diode (LED) lights of the infrared touch screens on the market is generally a one-by-one scanning, which is monotonous. Although the frame rate can reach about 120 Hz under a single-pen writing/drawing, as the speed of writing/drawing increases or the number of pens for writing/drawing increases, smoothness of the writing/drawing decreases and thus the user experience is poor.

SUMMARY

In view of the above, one or more embodiments of the present application propose an infrared touch scanning method.

An infrared touch scanning method according to embodiments of the present application includes: grouping transmitting lights located on a frame of an infrared touch screen to obtain at least two transmitting light groups; setting at least two scanning modes and setting one of the scanning modes as a basic scanning mode, in which each of the scanning modes corresponds to at least one of the transmitting light groups and the scanning modes each correspond to different numbers of transmitting lights; establishing a corresponding relationship between the at least two scanning modes and a writing speed, in which the faster the writing speed, the less the number of the transmitting lights corresponding to the scanning mode associated with the writing speed; performing a scanning using the basic scanning mode to determine a current writing speed of a user; determining a corresponding scanning mode from the scanning modes according to the corresponding relationship and the current writing speed of the user; and performing a scanning using the determined corresponding scanning mode. Herein, grouping the transmitting lights located on the frame of the infrared touch screen includes: circularly numbering M transmitting lights located on the frame of the infrared touch screen from 1 to n in sequence from left to right, in which n is a natural number greater than 1; and grouping the transmitting lights with a same number into one group to obtain n transmitting light groups.

Herein, a number of the scanning modes is less than or equal to a number of the transmitting light groups, and in which one of the scanning modes corresponds to one of the transmitting light groups, and another of the scanning modes corresponds to all of the transmitting light groups.

Herein, performing the scanning using the basic scanning mode to determine the current writing speed of the user includes: determining the transmitting lights corresponding to the basic scanning mode; performing a one-by-one scanning by turning on the transmitting lights one by one to obtain a plurality of touch points of the user within a unit time; determining a moving distance of the touch points within the unit time according to the plurality of touch points; and determining the current writing speed of the user according to the moving distance of the touch points within the unit time.

Herein, performing the scanning using the determined corresponding scanning mode includes: determining the transmitting lights corresponding to the determined corresponding scanning mode; and performing a one-by-one scanning by turning on the transmitting lights corresponding to the determined corresponding scanning mode one by one.

Corresponding to the infrared touch scanning method, embodiments of the present application further provide an infrared touch scanning control apparatus, including:
  a grouping module configured to group transmitting lights located on a frame of an infrared touch screen to obtain at least two transmitting light groups;
  a scanning mode setting module configured to set at least two scanning modes and setting one of the scanning modes as a basic scanning mode, in which each of the scanning modes corresponds to at least one of the transmitting light groups and the scanning modes each correspond to different numbers of transmitting lights;
  a scanning mode mapping module configured to establish a corresponding relationship between the at least two scanning modes and a writing speed, in which the faster the writing speed, the less the number of the transmitting lights corresponding to the scanning mode associated with the writing speed;
  a writing speed detecting module configured to perform a scanning using the basic scanning mode to determine a current writing speed of a user;
  a scanning mode determining module configured to determine a corresponding scanning mode from the scanning modes according to the corresponding relationship and the current writing speed of the user; and
  a scanning control module configured to perform a scanning using the determined corresponding scanning mode.

Herein, the writing speed detecting module includes:
  a first transmitting light determining unit configured to determine the transmitting lights corresponding to the basic scanning mode;

a first scanning unit configured to perform a one-by-one scanning by turning on the transmitting lights one by one to obtain a plurality of touch points of the user within a unit time;

a moving distance detecting unit configured to determine a moving distance of the touch points within the unit time according to the plurality of touch points; and a speed determining unit configured to determine the current writing speed of the user according to the moving distance of the touch points within the unit time.

Herein, the scanning control module includes:

a second transmitting light determining unit configured to determine the transmitting lights corresponding to the determined corresponding scanning mode; and a second scanning unit configured to perform a one-by-one scanning by turning on the transmitting lights corresponding to the determined corresponding scanning mode one by one.

One or more embodiments of the present application further provide an electronic device including: a memory, a processor, and a computer program stored on the memory and executable on the processor, in which the processor, when executing the computer program, implements the infrared touch scanning method.

One or more embodiments of the present application further provide a non-transitory computer readable storage medium storing computer instructions for causing a computer to execute the infrared touch scanning method.

BRIEF DESCRIPTION OF THE DRAWINGS

In order to more clearly illustrate one or more embodiments of the present application or technical solutions in the related art, the drawings required for describing the embodiments or the related art will be briefly described. Obviously, the drawings described below are only one or more embodiments of the present application. For a person skilled in the art, other drawings can be obtained from these drawings without any inventive effort.

DETAILED DESCRIPTION

In order to make the objects, technical solutions and advantages of the present application clearer, the present application is further described in detail below with reference to the specific embodiments and the drawings.

It should be noted that, unless otherwise defined, technical or scientific terms used in one or more embodiments of the present application shall have the ordinary meaning as understood by one with ordinary skill in the art to which the present application belongs. Terms such as "first", "second" and the like used in one or more embodiments of the present application do not indicate any order, quantity, or importance, but rather are used to distinguish one component from another. Terms such as "comprise" or "include" and the like means that an element or item preceding the term encompasses an element or item listed after the term and equivalents thereof, but does not exclude other elements or items. Terms such as "connect" or "connected" and the like are not limited to physical or mechanical connections, and may include direct or indirect electrical connections. Terms such as "above", "under", "left", "right" and the like are used only to show relative positional relationships, which may change accordingly when absolute positions of the described objects change.

As described above, currently the scanning logic of infrared LED lights of the infrared touch screens on the market is generally a one-by-one scanning, with the speed of writing/drawing increases or the number of pens for writing/drawing increases, smoothness of the writing/drawing decreases and thus the user experience is poor.

The above problems will be described in detail below through the drawings with reference to the specific embodiments.

Figure 1:
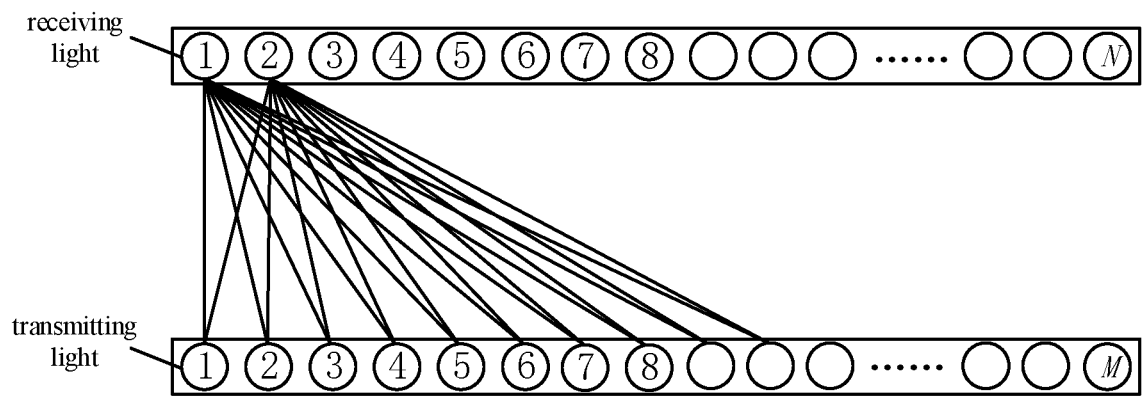
FIG. 1 shows a schematic view of a scanning logic for infrared LED lights of an infrared touch screen according to some embodiments of the present application.

FIG. 1 shows a schematic view of a scanning logic for infrared LED lights of an infrared touch screen according to the embodiments of the present application. As shown in FIG. 1, infrared LED lights of an infrared touch screen include a plurality of receiving lights and a plurality of transmitting lights, and the plurality of receiving lights and the plurality of transmitting lights are respectively installed on opposite frames of the infrared touch screen. For example, in FIG. 1, the N receiving lights are installed on an upper frame of the infrared touch screen, as shown by a plurality of circles in an upper rectangular frame in FIG. 1; and the M transmitting lights are installed on a lower frame of the infrared touch screen, as shown by a plurality of circles in a lower rectangular frame in FIG. 1. Herein, the receiving lights are numbered as 1, 2, 3, N in sequence from left to right; and similarly, the transmitting lights are numbered as 1, 2, 3, . . . , M in sequence from left to right.

Assuming that there are m transmitting lights within a receiving angle range of the infrared LED light numbered as receiving light 1, and the m transmitting lights are numbered as transmitting lights 1, 2, m, respectively. Then, infrared rays emitted by these m transmitting lights may be received by the receiving light 1. Similarly, there are also m transmitting lights within a receiving angle range of the infrared LED light numbered as receiving light 1, and the m transmitting lights are numbered as transmitting lights k+1, k+2, . . . , k+m, respectively. Then, infrared rays emitted by these m transmitting lights may be received by the receiving light 1. If each of the receiving lights and the m transmitting lights within its receiving angle range are connected through straight lines, a net may be obtained, and in the embodiments of the present application, the net formed by connecting the transmitting lights and the receiving lights may be referred to as an infrared grid. It may be understood that if a touch position of a user falls on the infrared grid, the touch position can be recognized by the infrared LED lights, and if the touch position of the user does not fall on the grid, the touch position cannot be recognized.

As described above, currently the scanning logic of infrared LED lights of the infrared touch screens on the market is a one-by-one scanning. The one-by-one scanning means that the M transmitting lights are turned on in sequence according to a certain order to send infrared signals, and the N receiving lights receive the infrared signals sent by the M transmitting lights and recognize the touch position of the user on the infrared touch screen according to the received infrared signals, so as to form a writing/drawing track of the user.

Figure 2A:
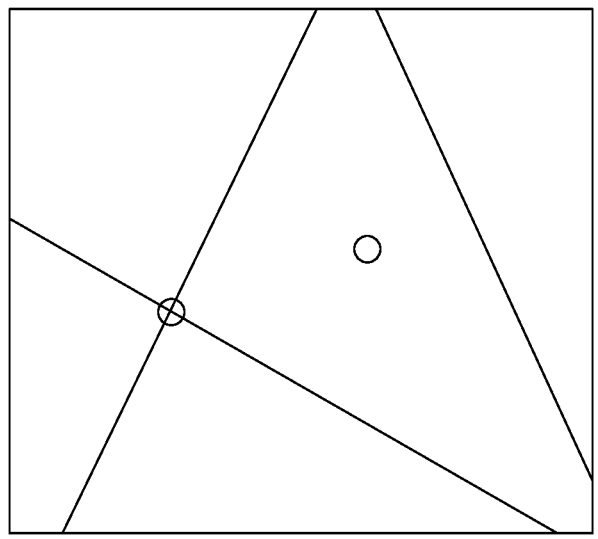
FIG. 2*a* shows a schematic view of a relationship between touch points and infrared grids under a slow writing/drawing according to some embodiments of the present application.
Figure 2B:
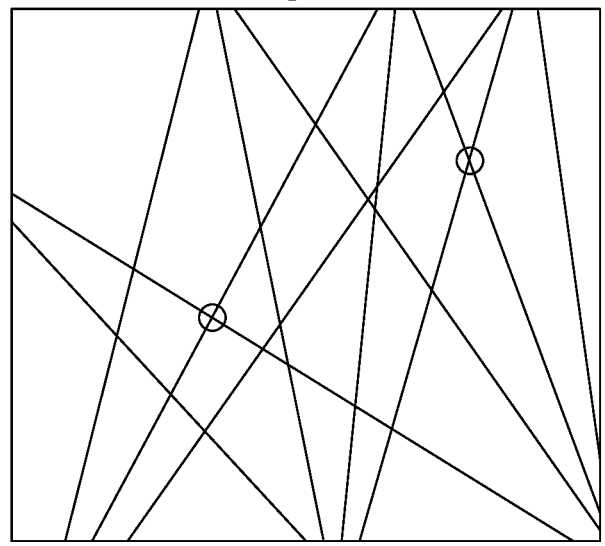
FIG. 2*b* shows a schematic view of a relationship between touch points and infrared grids under a fast writing/drawing according to some embodiments of the present application.

It may be seen that, with the one-by-one scanning, when the user writes/draws slowly, that is, the user's pen/finger moves relatively slowly, the pen/finger moves a small distance within a unit time. When the user writes/draws quickly, that is, the user's pen/finger moves relatively quickly, the pen/finger moves a great distance within a unit time. FIG. 2a shows a schematic view of a relationship between touch points and infrared grids under a slow writing/drawing according to some embodiments of the present application. As shown in FIG. 2a, if the pen/finger moves from the left small circle to the position of the right small circle within the unit time, and if the infrared grids are so sparse that no red infrared ray passes through the right small circle, the position of the right small circle cannot be recognized when the pen/finger moves to the position of the right small circle. FIG. 2b shows a schematic view of a relationship between touch points and infrared grids under a fast writing/drawing according to some embodiments of the present application. As shown in FIG. 2b, if the pen/finger moves from the left small circle to the position of the right small circle within unit time, since the pen/finger moves a great distance within the unit time, a plurality of infrared grids are passed between the two small circles. Therefore, it may be seen that when the user writes/draws slowly, relatively dense infrared grids are required; and when the user writes/draws quickly, relatively sparse infrared grids may satisfy the scanning requirement.

Figure 3:
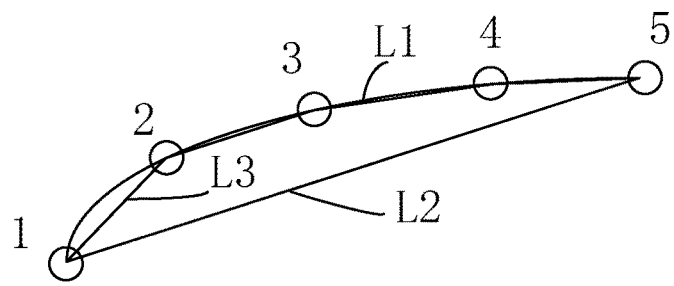
FIG. 3 shows an example of a relationship between scanning times within a unit time and a frame rate according to some embodiments of the present application.

On the other hand, it is known that the frame rate of infrared touch refers to the number of points obtained by scanning within the unit time. FIG. 3 shows an example of a relationship between scanning times within a unit time and a frame rate according to some embodiments of the present application. As shown in FIG. 3, it is assumed that the line labeled as L1 is an actual track of pen/finger movement within the unit time. If scanning is performed only twice within the unit time, that is, the captured points include only the first point and the fifth point, the scanning result is the line labeled as L2 in FIG. 3, that is, a straight line, which is very different from the actual track of pen/finger movement. However, if scanning is performed five times within the unit time, that is, the first point, the second point, the third point, the fourth point and the fifth point are obtained by the scanning, the obtained track of pen/finger movement is the polyline labeled as L3. Obviously, the polyline labeled as L3 is closer to the actual track of movement L1, and its smoothness is also better. Therefore, it may be seen that when the user writes/draws quickly, the scanning times within the unit time need to be increased to improve the smoothness of the detected track; and when the user writes/draws slowly, relatively less scanning times within the unit time may satisfy the smoothness requirement.

It can be seen from the above research that when the user writes/draws slowly, the requirement for density of the infrared grids is high, but the requirement for the scanning times within the unit time (that is, the frame rate) is not high; and when the user writes/draws quickly, the requirement for density of the infrared grids is not high, but the requirement for the frame rate is high.

Based on the results of the above research, the embodiments of the present application propose an infrared touch scanning method, which can adjust density and frame rate of the infrared grids according to the writing speed of the user, so as to satisfy the smoothness requirement for the scanning result.

Figure 4:
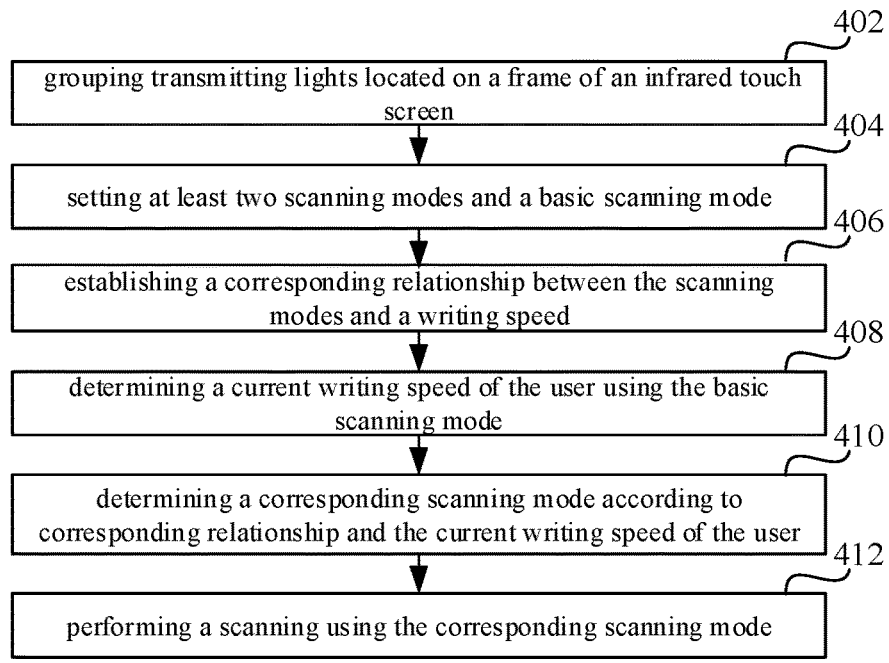
FIG. 4 shows a flow diagram of an infrared touch scanning method according to some embodiments of the present application.

FIG. 4 shows a flow diagram of an infrared touch scanning method according to some embodiments of the present application. The method can be implemented by an infrared touch scanning control apparatus located on the infrared touch screen. As shown in FIG. 4, the method may include the following steps.

Step 402: grouping transmitting lights located on a frame of an infrared touch screen to obtain at least two transmitting light groups.

Specifically, in the embodiments of the present application, the M transmitting lights located on the frame of the infrared touch screen may firstly be circularly numbered from 1 to n in sequence from left to right, in which n is a natural number greater than 1. That is, the M transmitting lights are numbered, starting from 1, in sequence from left to right, until n; the next transmitting light after the previous transmitting light number as n is numbered as 1 again, and so on, until the last transmitting light is numbered in such a circular way. After the numbering is completed, the transmitting lights with a same number are grouped into one group to obtain n transmitting light groups. That is, the transmitting lights numbered as 1 are grouped into one group (a first transmitting light group), the transmitting lights numbered as 2 are grouped into one group (a second transmitting light group), . . . , and the transmitting lights numbered as n are grouped into one group (an n-th transmitting light group). The transmitting lights located on the frame of the infrared touch screen may thus be divided into n groups.

Figure 5:
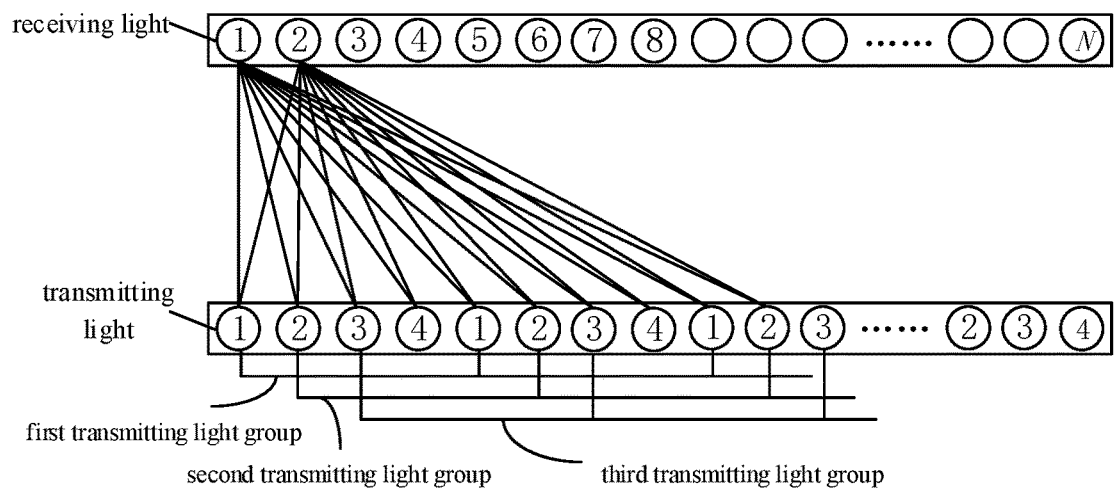
FIG. 5 shows an example of grouping transmitting lights according to some embodiments of the present application.

FIG. 5 shows an example of grouping transmitting lights according to some embodiments of the present application. In the example shown in FIG. 5, n is set to be 4, that is, the M transmitting lights located on the frame of the infrared touch screen are circularly numbered from 1 to 4 in sequence from left to right. The transmitting lights numbered as 1 are grouped into the first transmitting light group, the transmitting lights numbered as 2 are grouped into the second transmitting light group, the transmitting lights numbered as 3 are grouped into the third transmitting light group, and the transmitting lights numbered as 4 are grouped into the fourth transmitting light group, therefore 4 groups of transmitting lights are obtained in total.

Step 404: setting at least two scanning modes and setting one of the scanning modes as a basic scanning mode, in which each of the scanning modes corresponds to at least one of the transmitting light groups and the scanning modes each correspond to different numbers of transmitting lights, and each of the scanning modes performs the one-by-one scanning using its corresponding transmitting lights.

In the embodiments of the present application, a number of the scanning modes may be less than or equal to a number of the transmitting light groups. Herein, one of the scanning modes corresponds to one of the transmitting light groups, that is, a number of corresponding transmitting lights is the least; and another of the scanning modes corresponds to all of the transmitting light groups, that is, a number of corresponding transmitting lights is the most. Other scanning modes may be set according to actual needs, which is not limited in the present application.

As an example, in the embodiments of the present application, a first scanning mode may correspond to one transmitting light group (for example, the first transmitting light group), a second scanning mode may correspond to two transmitting light groups (for example, the first transmitting light group and the second transmitting light group), a third scanning mode may correspond to three transmitting light groups (for example, the first transmitting light group, the second transmitting light group and the third transmitting light group), . . . , and the n-th scanning mode may correspond to all of n transmitting light groups.

Moreover, for each of the scanning modes, whether the scanning mode specifically corresponds to which transmitting light group or which transmitting light groups is not limited in the present application, and may be set according to actual situation.

Moreover, in the embodiments of the present application, any one of the at least two scanning modes may be set as the basic scanning mode.

Step 406: establishing a corresponding relationship between the at least two scanning modes and a writing speed, in which the faster the writing speed, the less the number of the transmitting lights corresponding to the scanning mode associated with the writing speed.

For example, in the above example, in the embodiments of the present application, the first scanning mode to the n-th scanning mode may correspond to n writing speed ranges from fast to slow, respectively. It should be noted that boundary values of the various writing speed ranges may be set empirically.

It may be seen that, with the above corresponding relationship, the faster the writing speed, the less the number of the transmitting lights corresponding to the scanning mode associated with the writing speed, the sparser the infrared grids, but the less the time required to complete one scanning, that is, the greater the frame rate; and the slower the writing speed, the greater the number of the transmitting lights corresponding to the scanning mode associated with the writing speed, the denser the infrared grids, but the more the time required to complete one scanning, that is, the less the frame rate.

Step 408, determining the current writing speed of the user using the basic scanning mode.

In embodiments of the present application, the step 408 may include:

firstly, determining the transmitting lights corresponding to the basic scanning mode;

next, performing a one-by-one scanning by turning on the transmitting lights one by one to obtain a plurality of touch points of the user within a unit time;

then, determining a moving distance of the touch points within the unit time according to the plurality of touch points; and finally, determining the writing speed of the user according to the moving distance of the touch points within the unit time.

Step 410, determining a corresponding scanning mode from the scanning modes according to the corresponding relationship and the writing speed of the user.

In the embodiments of the present application, the corresponding scanning mode may be determined according to the corresponding relationship between the scanning modes and the writing speed of the user established at the step 406.

Step 412, performing a scanning using the corresponding scanning mode.

In the embodiments of the present application, at the step 412, firstly, a plurality of transmitting lights corresponding to the scanning mode may be determined; and then, these transmitting lights are turned on one by one to perform a one-by-one scanning. It should be noted that, in the embodiments of the present application, the transmitting lights that are not corresponding to the scanning mode associated with the writing speed of the user do not operate.

It can be seen that, in the infrared touch scanning method as described above, a plurality of scanning modes are set, in which the scanning modes each correspond to different numbers of transmitting lights and further correspond to different writing speeds of the user. In practice, a suitable scanning mode is determined by detecting the writing speed of the user. For example, when the user writes slowly, a scanning mode corresponding to a great number of transmitting lights may be selected, so that relatively dense infrared grids but a relatively low frame rate may be obtained, which is suitable for the requirement of infrared touch scanning for slow writing; and when the user writes quickly, a scanning mode corresponding to a small number of transmitting lights may be selected, although the obtained infrared grids are relatively sparse, since a small number of transmitting lights are involved in the scanning, the scanning times within the unit time may be increased, which is suitable for the requirement of infrared touch scanning for fast writing.

Figure 6:
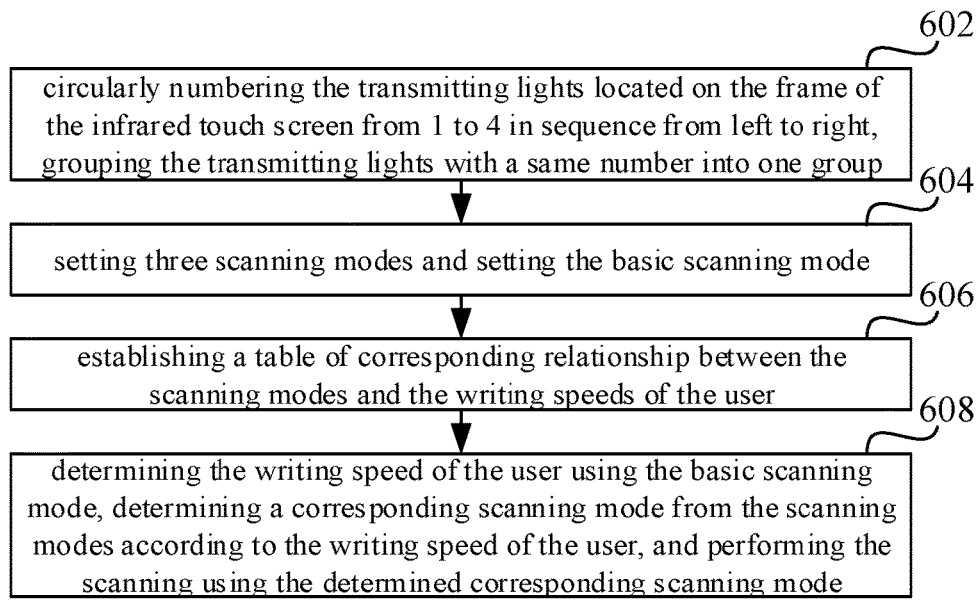
FIG. 6 shows a flow diagram of an exemplary infrared touch scanning according to the present application.

The infrared touch scanning method will be described below with reference to a specific example. FIG. 6 shows a specific example of an infrared touch scanning method according to the embodiments of the present application. As shown in FIG. 6, the method includes the following steps.

Step 602: circularly numbering the M transmitting lights located on the frame of the infrared touch screen from 1 to 4 in sequence from left to right, and grouping the transmitting lights with a same number into one group, so as to obtain the first transmitting light group, the second transmitting light group, the third transmitting light group and the fourth transmitting light group.

Step 604, setting three scanning modes, in which a first scanning mode corresponds to the first transmitting light group, a second scanning mode corresponds to the first transmitting light group and the third transmitting light group, and a third scanning mode corresponds to all of the transmitting light groups; and setting the first scanning mode as the basic scanning mode.

Figure 7A:
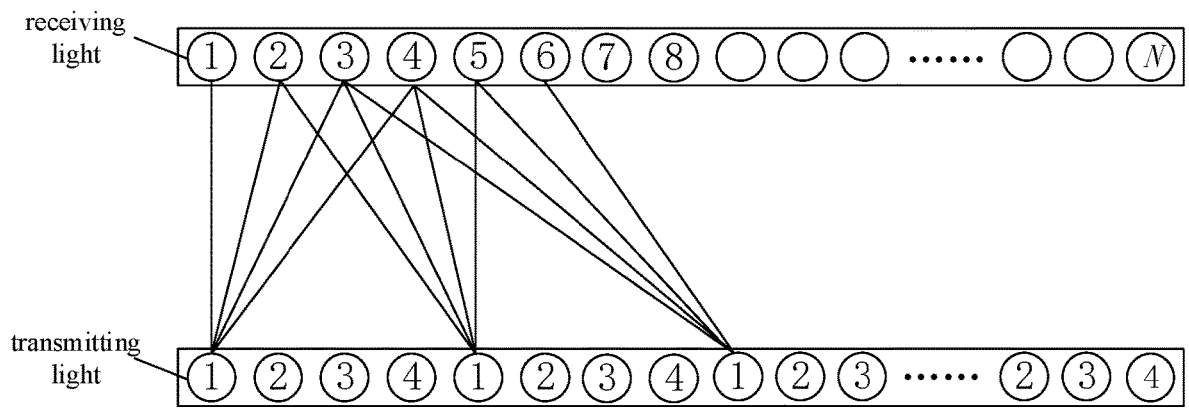
FIG. 7*a* shows a schematic view of infrared grids under a first scanning mode according to embodiments of the present application.
Figure 7B:
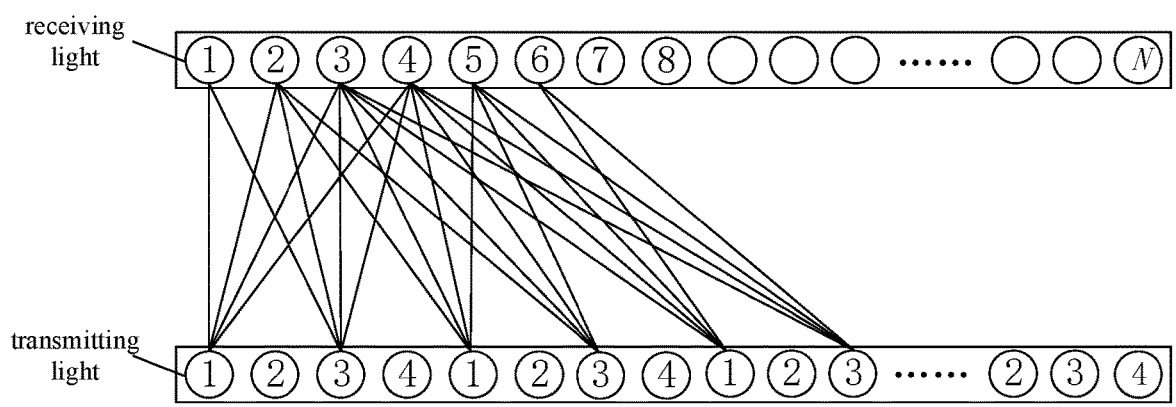
FIG. 7*b* shows a schematic view of infrared grids under a second scanning mode according to embodiments of the present application.
Figure 7C:
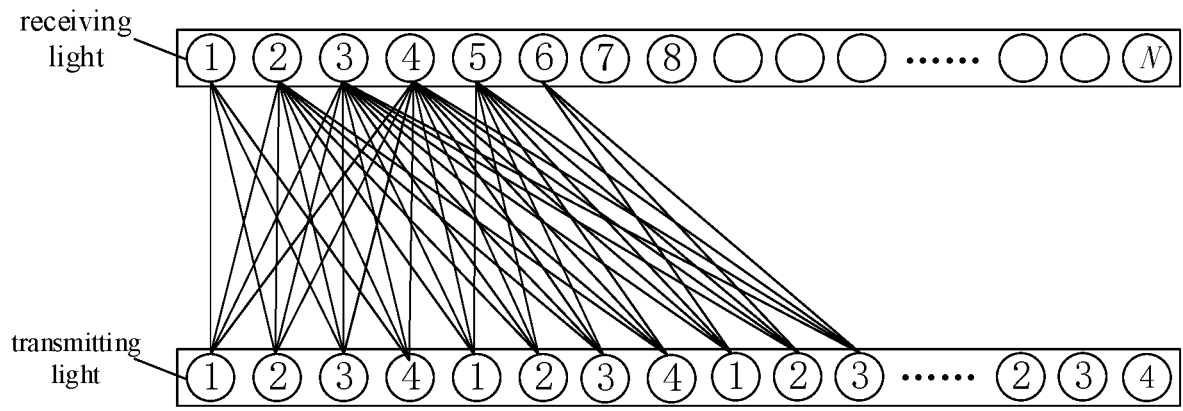
FIG. 7*c* shows a schematic view of infrared grids under a third scanning mode according to embodiments of the present application.

FIG. 7a shows infrared grids under a first scanning mode according to embodiments of the present application, in which only the transmitting lights numbered as 1 emit infrared signals and the other transmitting lights do not operate. FIG. 7b shows infrared grids under a second scanning mode according to embodiments of the present application, in which only the transmitting lights numbered as 1 and 3 emit infrared signals and the other transmitting lights do not operate. FIG. 7c shows infrared grids under a third scanning mode according to embodiments of the present description, in which all of the transmitting lights operate. It may be seen from FIG. 7a to FIG. 7c that the less the number of the transmitting lights corresponding to the scanning mode, the sparser the infrared grids. Conversely, the greater the number of the transmitting lights corresponding to the scanning mode, the denser the infrared grids.

However, since each of the scanning modes is the one-by-one scanning, the less the number of the transmitting lights corresponding to the scanning mode, the less the time required to complete one scanning, that is, the more the scanning times that can be completed within the unit time, and thus the greater the frame rate. Conversely, the greater the number of the transmitting lights corresponding to the scanning mode, the less the frame rate.

Step 606: establishing a table of corresponding relationship between the scanning modes and the writing speeds of the user as shown in Table 1 below.

TABLE 1

| scanning mode | user's corresponding writing speed range |
|---|---|
| first scanning mode | (V1, ∞) |
| second scanning mode | [V2, V1], in which V2 < V1 |
| third scanning mode | (0, V2) |

Step 608, determining the writing speed of the user using the basic scanning mode, determining a corresponding scanning mode from the scanning modes according to the writing speed of the user, and performing the scanning using the determined corresponding scanning mode.

In this manner, under a condition that the writing speed of the user determined by the basic scanning mode is greater than V1, it may be considered that the user writes quickly, and under this condition, the first scanning mode with a high frame rate but relatively sparse infrared grids is used. Under the first scanning mode, only the transmitting lights numbered as 1 perform the one-by-one scanning, and the other transmitting lights do not operate, therefore the frame rate is four times of the frame rate of the third scanning mode in which all of the transmitting lights operate. Under a condition that the writing speed of the user determined by the basic scanning mode is less than V2, it may be considered that the user writes slowly, and under this condition, the third scanning mode with a low frame rate but relatively dense infrared grids is used. Under the third scanning mode, all of the transmitting lights perform the one-by-one scanning. Under a condition that the writing speed of the user determined by the basic scanning mode is greater than or equal to V2 and less than or equal to V1, it may be considered that the user writes at a medium speed, and under this condition, the second scanning mode with a medium frame rate and infrared grids with medium density is used. Under the second scanning mode, only the transmitting lights numbered as 1 and 3 perform the one-by-one scanning, and the other transmitting lights do not operate, therefore the frame rate is two times of the frame rate of the third scanning mode in which all of the transmitting lights operate.

It can be seen that the infrared touch scanning method as described above can select a suitable infrared touch scanning mode according to the writing speed of the user. When the writing speed of the user is relatively fast, the scanning mode with the high frame rate but the relatively sparse infrared grids is selected, and when the writing speed of the user is relatively slow, the scanning mode with the low frame rate but the relatively dense infrared grids is selected, so that the scanning requirements by the fast writing and the slow writing are sufficiently used to improve smoothness of a writing track of the user obtained by the scanning.

Figure 8:
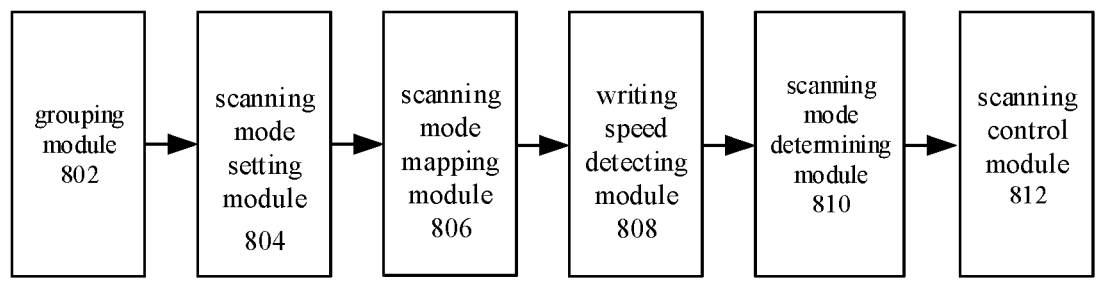
FIG. 8 shows a schematic view of internal structure of an infrared touch scanning control apparatus according to some embodiments of the present application.

Corresponding to the infrared touch scanning method, the embodiments of the present application further provide an infrared touch scanning control apparatus. FIG. 8 shows internal structure of an infrared touch scanning control apparatus according to embodiments of the present application. As shown in FIG. 8, the infrared touch scanning control apparatus includes:

a grouping module 802 configured to group transmitting lights located on a frame of an infrared touch screen to obtain at least two transmitting light groups;

a scanning mode setting module 804 configured to set at least two scanning modes and setting one of the scanning modes as a basic scanning mode, in which each of the scanning modes corresponds to at least one of the transmitting light groups and the scanning modes each correspond to different numbers of transmitting lights, and each of the scanning modes performs the one-by-one scanning using its corresponding transmitting lights;

a scanning mode mapping module 806 configured to establish a corresponding relationship between the at least two scanning modes and a writing speed of the user, in which the faster the writing speed of the user, the less the number of the transmitting lights corresponding to the scanning mode associated with the writing speed;

a writing speed detecting module 808 configured to determine the writing speed of the user using the basic scanning mode;

a scanning mode determining module 810 configured to determine a corresponding scanning mode from the scanning modes according to the corresponding relationship and the writing speed of the user; and a scanning control module 812 configured to perform a scanning by controlling the transmitting lights to use the corresponding scanning mode.

In the embodiments of the present application, the writing speed detecting module 808 may include:

a first transmitting light determining unit configured to determine the transmitting lights corresponding to the basic scanning mode;

a first scanning unit configured to perform a one-by-one scanning by turning on the transmitting lights one by one to obtain a plurality of touch points of the user within a unit time;

a moving distance detecting unit configured to determine a moving distance of the touch points within the unit time according to the plurality of touch points; and a speed determining unit configured to determine the current writing speed of the user according to the moving distance of the touch points within the unit time.

In the embodiments of the present application, the scanning control module 812 may include:

a second transmitting light determining unit configured to determine the transmitting lights corresponding to the determined corresponding scanning mode; and a second scanning unit configured to perform a one-by-one scanning by turning on the transmitting lights corresponding to the determined corresponding scanning mode one by one.

Specific implementations of the various modules and units as described above may be referred to the foregoing infrared touch scanning method, which are not repeated herein.

It can be seen that the infrared touch scanning control apparatus as described above can select a suitable infrared touch scanning mode according to the writing speed of the user. When the writing speed of the user is relatively fast, the scanning mode with the high frame rate but the relatively sparse infrared grids is selected, and when the writing speed of the user is relatively slow, the scanning mode with the low frame rate but the relatively dense infrared grids is selected, so that the scanning requirements by the fast writing and the slow writing are sufficiently used to improve smoothness of a writing track of the user obtained by the scanning.

It should be noted that the methods according to one or more embodiments of the present application may be implemented by a single device, such as a computer or a server. The methods of the embodiments may further be applied to a distributed scenario and accomplished by a cooperation of a plurality of devices. In such a distributed scenario, one of the plurality of devices may only implement one or more steps of the methods according to one or more embodiments of the present application, and the plurality of devices may interact with each other to complete the methods.

Specific embodiments of the present application have been described above. Other embodiments are within the scope of the appended claims. Under some conditions, acts or steps recited in the claims may be implemented in an order different from that in the embodiments and can still achieve desired results. In addition, the processes depicted in the drawings do not necessarily require the particular order or sequential order as shown to achieve the desired results. Multi-tasking processing and parallel processing are also possible or may be beneficial in some implementations.

For convenience of description, the apparatus is divided into various modules according to functions and described respectively. Of course, the functions of the various modules may be implemented in one or more software and/or hardware when one or more embodiments of the present application are implemented.

The apparatus of the above embodiments is configured to implement the corresponding method of the foregoing embodiments and has beneficial effects of the embodiments of the corresponding method, which are not repeated herein.

Figure 9:
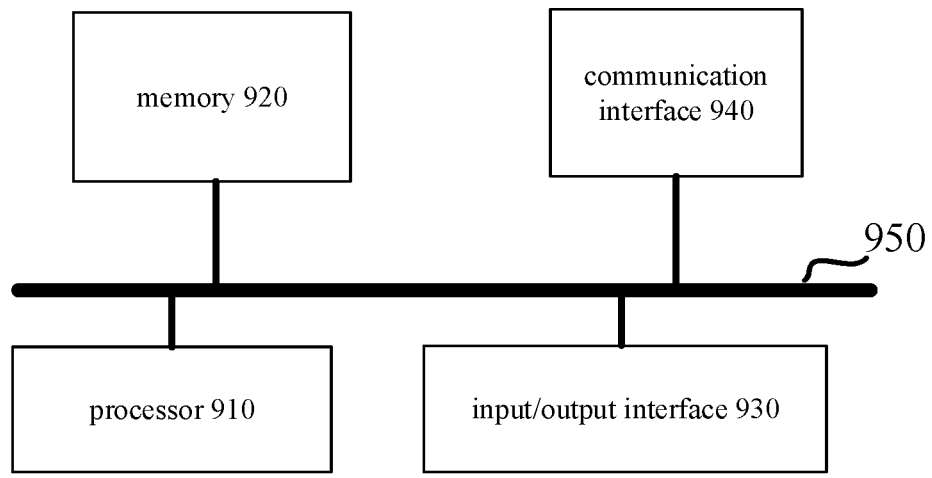
FIG. 9 shows a schematic view of internal structure of an electronic device according to some embodiments of the present application.

FIG. 9 shows a relatively specific schematic structural view of hardware of an electronic device according to embodiments of the present application, and the device may include a processor 910, a memory 920, an input/output interface 930, a communication interface 940 and a bus 950. Herein, the processor 910, the memory 920, the input/output interface 930 and the communication interface 940 are communicatively connected to each other in the device via the bus 950.

The processor 910 may be implemented by a general-purpose central processing unit (CPU), a microprocessor, an application specific integrated circuit (ASIC), or one or more integrated circuits, and may be configured to execute relevant programs to implement the infrared touch scanning method according to the embodiments of the present application.

The memory 920 may be implemented in a form of a read only memory (ROM), a random access memory (RAM), a static storage device, a dynamic storage device and the like. The memory 920 may store an operating system and other application programs, and when the infrared touch scanning method according to the embodiments of the present application are implemented by software or firmware, relevant program codes are stored in the memory 920 and are called and executed by the processor 910.

The input/output interface 930 is configured to connect input/output modules to achieve input and output of information. The input/output modules may be provided as components in the device (not shown in the drawings) or may be externally connected to the device to provide corresponding functions. Herein, an input device may include a keyboard, a mouse, a touch screen, a microphone, various sensors and the like, and an output device may include a display, a speaker, a vibrator, an indicator light and the like.

The communication interface 940 is configured to connect communication modules (not shown in the drawings) to achieve communicative interaction between the device and other devices. Herein, the communication modules may achieve wire communication (such as USB, network cable and the like) or wireless communication (such as mobile network, WIFI, bluetooth and the like).

Bus 950 includes paths for communicating information among the various components of the device, such as the processor 910, the memory 920, the input/output interface 930, and the communication interface 940.

It should be noted that although only the processor 910, the memory 920, the input/output interface 930, the communication interface 940 and the bus 950 are shown for the device as described above, in specific implementations, the device may further include other components necessary for its normal operation. Moreover, those skilled in the art may appreciate that the device as described above may include only the components that are necessary to implement the embodiments of the present application, and may not necessarily include all of the components shown in the drawings.

The computer-readable medium of the embodiments may include a permanent/non-permanent medium, or a removable/non-removable medium, which may achieve storage of information by any method or technology. The information may be computer readable instructions, data structures, modules of a program, or other data. Examples of the computer storage medium include, but are not limited to: phase random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic cassettes, magnetic tape magnetic disk storage or other magnetic storage devices, or any other non-transmission medium which may be used to store information accessible to a computing device.

A person skilled in the art should appreciate that the discussion of any of the above embodiments is only exemplary, but not to imply that the scope of the present application (including the claims) is limited to these examples. Under the concept of the present application, technological features of the above embodiments or different embodiments may be combined, the steps may be implemented in any order, and there are many other variations of different aspects of one or more embodiments of the present application described above, which are not described in detail for clarity.

In addition, in order to simplify the illustration and discussion and not to obscure one or more embodiments of the present application, well-known power/ground connections of integrated circuit (IC) chips and other components may or may not be shown in the provided drawings. In addition, the apparatuses may be shown in a form of block diagram to avoid obscuring one or more embodiments of the present application, and the following fact is also considered: details concerning implementations of these apparatuses in the block diagrams are highly dependent upon the platform on which one or more embodiments of the present application are implemented (that is, these details should be completely within the knowledge of one skilled in the art). Under a condition that specific details (such as circuits) are set forth to describe exemplary embodiments of the present application, it will be apparent to one skilled in the art that one or more embodiments of the present application may be implemented without these specific details or with variations of these specific details. Therefore, theses descriptions are considered to be illustrative but not restrictive.

Although the present application has been described in conjunction with the specific embodiments of the present application, many alternatives, modifications, and variations of these embodiments will be apparent to one skilled in the art in light of the foregoing description. For example, other memory architectures (such as dynamic RAM (DRAM)) may use the discussed embodiments.

One or more embodiments of the present application are intended to encompass all such alternatives, modifications and variations falling within the broad scope of the appended claims. Therefore, any omissions, modifications, equivalent alternatives, and improvements that are made within the gist and principle of one or more embodiments of the present application should be encompassed in the scope of the present application.

What is claimed is:

1. An infrared touch scanning method, comprising:
   grouping transmitting lights located on a frame of an infrared touch screen to obtain at least two transmitting light groups;
   setting at least two scanning modes and setting one of the scanning modes as a basic scanning mode, wherein each of the scanning modes corresponds to at least one of the transmitting light groups and the scanning modes each correspond to different numbers of transmitting lights;
   establishing a corresponding relationship between the at least two scanning modes and a writing speed, wherein the faster the writing speed, the less the number of the transmitting lights corresponding to the scanning mode associated with the writing speed;
   performing a scanning using the basic scanning mode to determine a current writing speed of a user;
   determining a corresponding scanning mode from the scanning modes according to the corresponding relationship and the current writing speed of the user; and
   performing a scanning using the determined corresponding scanning mode.

2. The method according to claim 1, wherein grouping the transmitting lights located on the frame of the infrared touch screen comprises: circularly numbering M transmitting lights located on the frame of the infrared touch screen from 1 to n in sequence from left to right, wherein n is a natural number greater than 1; and grouping the transmitting lights with a same number into one group to obtain n transmitting light groups.

3. The method according to claim 1, wherein a number of the scanning modes is less than or equal to a number of the transmitting light groups, and wherein one of the scanning modes corresponds to one of the transmitting light groups, and another of the scanning modes corresponds to all of the transmitting light groups.

4. The method according to claim 1, wherein performing the scanning using the basic scanning mode to determine the current writing speed of the user comprises:
   determining the transmitting lights corresponding to the basic scanning mode;
   performing a one-by-one scanning by turning on the transmitting lights one by one to obtain a plurality of touch points of the user within a unit time;
   determining a moving distance of the touch points within the unit time according to the plurality of touch points; and
   determining the current writing speed of the user according to the moving distance of the touch points within the unit time.

5. The method according to claim 1, wherein performing the scanning using the determined corresponding scanning mode comprises:
   determining the transmitting lights corresponding to the determined corresponding scanning mode; and
   performing a one-by-one scanning by turning on the transmitting lights corresponding to the determined corresponding scanning mode one by one.

6. An infrared touch scanning control apparatus, comprising:
   a grouping module configured to group transmitting lights located on a frame of an infrared touch screen to obtain at least two transmitting light groups;
   a scanning mode setting module configured to set at least two scanning modes and setting one of the scanning modes as a basic scanning mode, wherein each of the scanning modes corresponds to at least one of the transmitting light groups and the scanning modes each correspond to different numbers of transmitting lights;
   a scanning mode mapping module configured to establish a corresponding relationship between the at least two scanning modes and a writing speed, wherein the faster the writing speed, the less the number of the transmitting lights corresponding to the scanning mode associated with the writing speed;
   a writing speed detecting module configured to perform a scanning using the basic scanning mode to determine a current writing speed of a user;
   a scanning mode determining module configured to determine a corresponding scanning mode from the scanning modes according to the corresponding relationship and the current writing speed of the user; and
   a scanning control module configured to perform a scanning using the determined corresponding scanning mode.

7. The apparatus according to claim 6, wherein the writing speed detecting module comprises:
   a first transmitting light determining unit configured to determine the transmitting lights corresponding to the basic scanning mode;
   a first scanning unit configured to perform a one-by-one scanning by turning on the transmitting lights one by one to obtain a plurality of touch points of the user within a unit time;
   a moving distance detecting unit configured to determine a moving distance of the touch points within the unit time according to the plurality of touch points; and a speed determining unit configured to determine the current writing speed of the user according to the moving distance of the touch points within the unit time.

8. The apparatus according to claim 6, wherein the scanning control module comprises:
a second transmitting light determining unit configured to determine the transmitting lights corresponding to the determined corresponding scanning mode; and
a second scanning unit configured to perform a one-by-one scanning by turning on the transmitting lights corresponding to the determined corresponding scanning mode one by one.

9. An electronic device comprising a memory, a processor, and a computer program stored on the memory and executable on the processor, wherein the processor, when executing the computer program, implements an infrared touch scanning method comprising:
grouping transmitting lights located on a frame of an infrared touch screen to obtain at least two transmitting light groups;
setting at least two scanning modes and setting one of the scanning modes as a basic scanning mode, wherein each of the scanning modes corresponds to at least one of the transmitting light groups and the scanning modes each correspond to different numbers of transmitting lights;
establishing a corresponding relationship between the at least two scanning modes and a writing speed, wherein the faster the writing speed, the less the number of the transmitting lights corresponding to the scanning mode associated with the writing speed;
performing a scanning using the basic scanning mode to determine a current writing speed of a user;
determining a corresponding scanning mode from the scanning modes according to the corresponding relationship and the current writing speed of the user; and
performing a scanning using the determined corresponding scanning mode.

10. A non-transitory computer readable storage medium storing computer instructions for causing a computer to execute the infrared touch scanning method according to claim 1.

11. The apparatus according to claim 6, wherein the grouping module is configured to group the transmitting lights located on the frame of the infrared touch screen by: circularly numbering M transmitting lights located on the frame of the infrared touch screen from 1 to n in sequence from left to right, wherein n is a natural number greater than 1; and grouping the transmitting lights with a same number into one group to obtain n transmitting light groups.

12. The apparatus according to claim 6, wherein a number of the scanning modes is less than or equal to a number of the transmitting light groups, and wherein one of the scanning modes corresponds to one of the transmitting light groups, and another of the scanning modes corresponds to all of the transmitting light groups.

13. The electronic device according to claim 9, wherein grouping the transmitting lights located on the frame of the infrared touch screen comprises: circularly numbering M transmitting lights located on the frame of the infrared touch screen from 1 to n in sequence from left to right, wherein n is a natural number greater than 1; and grouping the transmitting lights with a same number into one group to obtain n transmitting light groups.

14. The electronic device according to claim 9, wherein a number of the scanning modes is less than or equal to a number of the transmitting light groups, and wherein one of the scanning modes corresponds to one of the transmitting light groups, and another of the scanning modes corresponds to all of the transmitting light groups.

15. The electronic device according to claim 9, wherein performing the scanning using the basic scanning mode to determine the current writing speed of the user comprises:
determining the transmitting lights corresponding to the basic scanning mode;
performing a one-by-one scanning by turning on the transmitting lights one by one to obtain a plurality of touch points of the user within a unit time;
determining a moving distance of the touch points within the unit time according to the plurality of touch points; and
determining the current writing speed of the user according to the moving distance of the touch points within the unit time.

16. The electronic device according to claim 9, wherein performing the scanning using the determined corresponding scanning mode comprises:
determining the transmitting lights corresponding to the determined corresponding scanning mode; and
performing a one-by-one scanning by turning on the transmitting lights corresponding to the determined corresponding scanning mode one by one.

* * * * *